US011100279B2

(12) United States Patent
Chernov et al.

(10) Patent No.: US 11,100,279 B2
(45) Date of Patent: *Aug. 24, 2021

(54) CLASSIFYING INPUT FIELDS AND GROUPS OF INPUT FIELDS OF A WEBPAGE

(71) Applicant: Intersections Inc., Herndon, VA (US)

(72) Inventors: Mykola Chernov, Kyiv (UA); Pavlo Malin, Zaporizhzhia (UA); Oleksandr Chaikovskyi, Kyiv (UA); Vitalii Afanasiev, Lutsk (UA); Vasyl Shutovskyi, Kyiv (UA); Volodymyr Shelest, Kyiv (UA)

(73) Assignee: Intersections Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/081,558

(22) Filed: Oct. 27, 2020

(65) Prior Publication Data

US 2021/0089710 A1    Mar. 25, 2021

Related U.S. Application Data

(63) Continuation of application No. 16/657,113, filed on Oct. 18, 2019, now Pat. No. 10,839,147.

(30) Foreign Application Priority Data

Sep. 24, 2019   (UA) ............................... a 2019 09969

(51) Int. Cl.
*G06F 40/174*    (2020.01)
*G06F 16/958*    (2019.01)
(Continued)

(52) U.S. Cl.
CPC ........ *G06F 40/174* (2020.01); *G06F 16/9574* (2019.01); *G06F 16/986* (2019.01); *G06K 9/00449* (2013.01); *G06K 9/00456* (2013.01)

(58) Field of Classification Search
CPC .. G06F 16/986; G06F 16/9574; G06F 40/174; G06K 9/00449; G06K 9/00456
See application file for complete search history.

(56) References Cited

U.S. PATENT DOCUMENTS 6,208,339 B1 *   3/2001   Atlas ..................... G06F 3/0481
                                                                    715/205
7,206,998 B2     4/2007   Pennell et al.
(Continued)

OTHER PUBLICATIONS

Mancoridis et al., "A hierarchy of dynamic software views: from object-interactions to feature-interactions," 20th IEEE International Conference on Software Maintenance, 2004. Proceedings., Chicago, IlL, 2004, pp. 72-81.

(Continued)

*Primary Examiner* — Maikhanh Nguyen
(74) *Attorney, Agent, or Firm* — Banner & Witcoff, Ltd.

(57) ABSTRACT

A method, a system and a machine-readable data carrier, which are intended to classify input fields and groups of input fields of a webpage, are described. The method for classifying input fields and groups of input fields of a webpage may include a browser extension that contains program elements Content Script and Background Script and a program recognition module. The method may form a hierarchy of HTML-documents of a webpage. A multicomponent system for classifying input fields and groups of input fields of a webpage may include a processor device and a storage, and a set of instructions that, when executed by the processor, control the processor to form a hierarchy with grouped fields and a report file for HTML-documents of the webpage. The instructions may also identify elements of the HTML-documents on the webpage.

20 Claims, 6 Drawing Sheets

(51) Int. Cl.
*G06F 16/957* (2019.01)
*G06K 9/00* (2006.01)

(56) References Cited

U.S. PATENT DOCUMENTS

| | | | |
|---|---|---|---|
| 7,660,779 B2* | 2/2010 | Goodman | G06F 40/174 |
| | | | 706/48 |
| 9,098,481 B2 | 8/2015 | Gwozdz et al. | |
| 9,282,145 B2 | 3/2016 | Wei et al. | |
| 9,965,457 B2 | 5/2018 | Eschbach et al. | |
| 2002/0083068 A1* | 6/2002 | Quass | G06F 40/174 |
| 2004/0181749 A1 | 9/2004 | Chellapilla et al. | |
| 2005/0198563 A1 | 9/2005 | Kristjansson | |
| 2005/0257134 A1* | 11/2005 | Goodman | G06F 40/174 |
| | | | 715/226 |
| 2006/0179404 A1 | 8/2006 | Yolleck et al. | |
| 2008/0267505 A1 | 10/2008 | Dabet et al. | |
| 2014/0029046 A1 | 1/2014 | Ponnavaikko et al. | |
| 2014/0123057 A1 | 5/2014 | Eigner et al. | |
| 2014/0188756 A1 | 7/2014 | Ponnavaikko et al. | |
| 2014/0258828 A1 | 9/2014 | Lymer et al. | |
| 2015/0205777 A1 | 7/2015 | Campanelli et al. | |
| 2015/0279310 A1 | 10/2015 | Itakura et al. | |
| 2015/0281334 A1 | 10/2015 | Ushiki et al. | |
| 2017/0039178 A1 | 2/2017 | Eschbach et al. | |

OTHER PUBLICATIONS

Nuri et al., "Scriptor: using deictics, dialog, and supervised learning to convey instructions," Smc 2000 conference proceedings. 2000 ieee international conference on systems, man and cybernetics. 'cybernetics evolving to systems, humans, organizations, and their complex interactions', 2000, pp. 1128-1133.

* cited by examiner

Prior Art

CLASSIFYING INPUT FIELDS AND GROUPS OF INPUT FIELDS OF A WEBPAGE

CROSS-REFERENCE TO RELATED APPLICATION

This application claim priority to Ukrainian Application No. a 2019 09969, filed Sep. 24, 2019, and U.S. Non-Provisional patent application Ser. No. 16/657,113, filed Oct. 18, 2019, the disclosures of which are incorporated by reference herein in their entirety and made part hereof.

FIELD OF THE INVENTION

The invention relates to computer systems and methods, which enable to highlight groups of fields on a page by their close value, to determine a class of a group, to determine a class of each field. The invention may be used for systems for automatic fill of forms and fields on webpages.

BACKGROUND OF THE INVENTION

Systems for automatic fill of forms and fields are applications, which enable user to save time during surfing on webpages by means of automatic filling fields and forms on a webpage (e-mail/login/password/address/phone number etc.). Therefore, the user, upon entry to the webpage with the e-mail input field, will not spend time for manual inputting his/her e-mail, since this will be done by the system for automatic fill of forms and fields on the webpage, rather than by him/her.

In order to cause the system for automatic fill of forms and fields on webpages to place data in a correct way and not to fill a phone number input field with the user e-mail address, it is necessary to inform the system for automatic fill of forms and fields on webpages about a correct information about the input field (a class thereof) with its previous identification. Therewith, the webpage contains several input fields simultaneously, wherein each class thereof must be identified in a correct way (i.e., that the input field name belongs directly to a name, password—to a password, e-mail—to an e-mail, phone number—to a phone number etc.), and the present invention specifically aimed at correct identification and recognition of input fields (a field class) on a webpage.

Execution of a third-party code on web-sites is possible by means of implementation of browser extensions. The claimed invention utilizes a solution in the form of a browser extension. The browser extension consists of Content Script and Background Script. The Content Script is executed in each HTML-document of a page, the Background Script is executed once for the browser separately from webpages. Each Content Script is separated by its HTML-document, access for other HTML-documents is forbidden.

The webpage contains one main HTML-document. Each HTML-document may contain tags IFRAME, which contain child HTML-documents. Therefore, one webpage may consist of a tree of HTML-documents.

Figure 3:
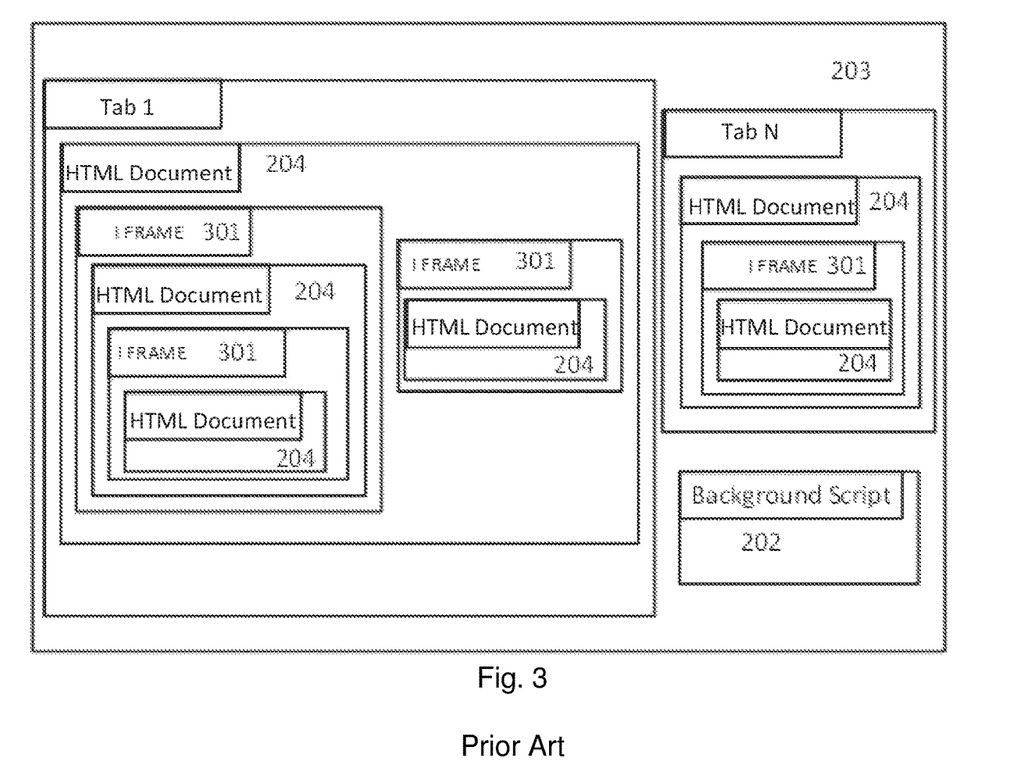
Figure 4:
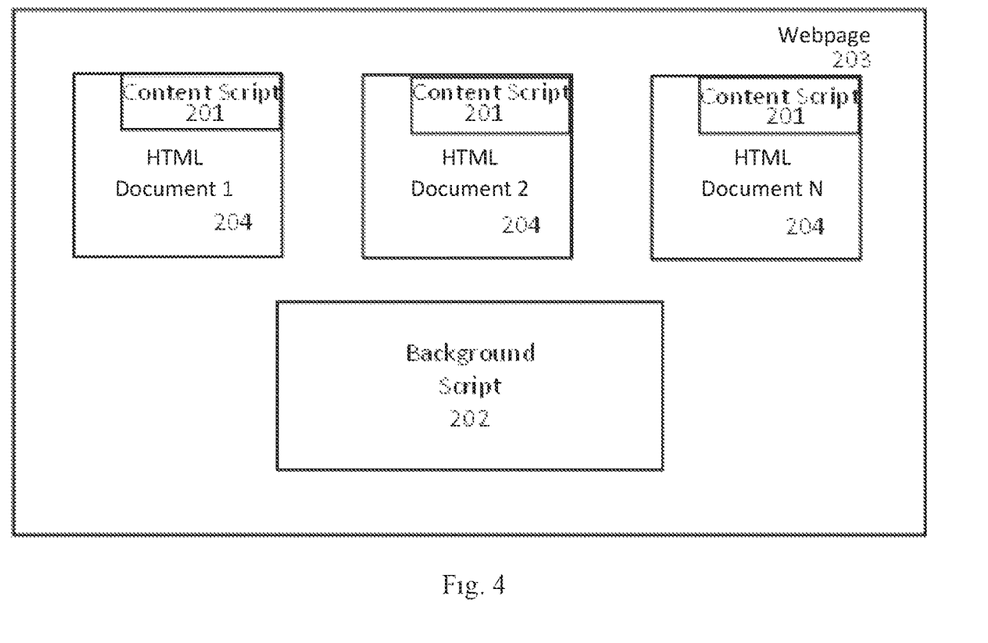

In order to obtain full information about the webpage, it is necessary to collect information about each HTML-document thereof, to reveal a hierarchy and a mutual location of these documents. An overall structure of a webpage is shown in FIG. 3. An overall structure of a webpage, when using the Content Script, is shown in FIG. 4.

Since the webpage may contain several documents, a hierarchy and a relationship must be established between all documents of the webpage. As it has been already mentioned previously, a webpage may be represented by several "catalogs" IFRAME, which have other HTML-documents with their elements inside. All of them must be associated between each other. Therewith, for each HTML-document a separate Content Script is run that is not associated with other HTML-documents, which, in turn, may be associated between each other by an integral webpage that is viewed by the user. However, each HTML-document of the webpage is analyzed by a separate Content Script independently from other.

PRIOR ART

A browser extension for automatic fill of forms or an applications for smartphones for automatic fill of forms is known, the extension provides a safe storage of user data and automatic fill of web-forms with the user personal data. A pop-up menu with the stored answers appears in front of or sideways of the form, wherein the user must input the required information. The user selects a required answer from a list of stored answers and put is into the corresponding electronic form. If there is no required value in the stored answers, the user clicks on the form and inputs data by himself/herself. The input data may be automatically added to the list of the stored answers (publication US 20140258828 A1 as of Sep. 11, 2014).

Also, a method of determining placement of an input indicator on an electronic fillable form is known, wherein the method comprising: identifying, by an electronic device, a confidence map associated with an electronic fillable form, wherein the confidence map comprises: for one or more fillable fields of the electronic fillable forms, a set of coordinates that define an area associated with each of one or more zones, wherein each of the fillable fields is associated with a graphical zone, a fill zone, a click zone and a start zone; receiving, by the electronic device, a selection of a portion of the electronic fillable form associated with one or more selection coordinates of the fillable electronic form; identifying a zone to which the selection coordinates correspond; and causing an input indicator to be displayed in the fill zone associated with the identified zone (publication US 20170039178 A1 as of Feb. 9, 2017).

The analogues, which are known from the prior art, do not imply building a hierarchy of elements of a webpage and using machine learning models for a system based on the built hierarchy that reduces operation correctness of a method for identifying and classifying input fields and groups of input fields of a webpage.

SUMMARY OF THE INVENTION

The claimed invention is aimed at solving a problem of correct identification and recognition of input fields, field class on the webpage by means of implementation of a method for classifying input fields and groups of input fields of a webpage. The invention is also aimed at creation of a system for classifying input fields and groups of input fields of a webpage, as well as a machine-readable data carrier for implementation of the claimed method.

Technical Effect

The invention enables to identify and recognize input fields, to determine a class of a field on a webpage, as well as to group input fields, to determine labels for the fields (groups of fields) found, which enables a user to save time during surfing of webpages by means of automatic fill of fields on the webpage, not to spend time for inputting his/her e-mail/login/password/address/phone number etc.

The stated problem is solved by a method for classifying input fields and groups of input fields of a webpage, the method being implemented by means of a browser extension that contains program elements Content Script and Background Script.

The method comprises forming a hierarchy of HTML-documents of a webpage, which comprises the following steps:
   running a separate Content Script for each HTML-document,
   generating an identifier of the HTML-document of the page, for which the Content Script is run, inside the Content Script,
   searching for an in-line frame inside each separate Content Script,
   generating an identifier for each found in-line frame,
   determining invisible elements in each HTML-document of the page,
   determining visible elements in each HTML-document, as well as elements with child documents,
   grouping the visible elements found in each HTML-document to create a report file,
   sending the created report file from the Content Script to the Background Script,
   forming the obtained structure of elements of each HTML-document of the page into a single tree of elements,
   sending the information from the Background Script to a program recognition module after completion of the hierarchy formation, wherein:
   the program recognition module determines all clickable elements and/or large texts on the page and/or form submission buttons and/or a label for each input field and/or a presence of element on the page that is a label for the input field and/or whether elements of the input field and buttons are elements of a single group and/or determines classes for each input field,
   sending the obtained results from the program recognition module to the Background Script, sending the results from the Background Script to each Content Script of the html-document of the webpage.

In one of embodiments of the method, each Content Script is separated by its HTML-document, access for other HTML-documents is forbidden.

According to further embodiment of the method, a message with a unique identifier of the in-line frame is sent into each in-line frame.

According to further embodiment of the method, a message from a parent Content Script with an identifier of a parent in-line frame is sent into each Content Script except for a root one.

According to further embodiment of the method, the hierarchy between the documents is determined by a pair "identifier of the document—identifier of the parent in-line frame".

According to further embodiment of the method, invisible elements of the HTML-documents are excluded from further analysis.

According to further embodiment of the method, elements to be processed in each HTML-documents comprise input fields with tags INPUT, SELECT, TEXTAREA.

According to further embodiment of the method, the hierarchy and association between visible elements of the webpage are displayed in the report file.

According to further embodiment of the method, coordinates of each element of the webpage are calculated in the obtained tree of elements.

According to the second aspect, the invention is implemented as a multicomponent system for classifying input fields and groups of input fields of a webpage, the system comprising, connected with each other by a communication interface, a processor device and a means for data operating storage and processing, and a means for data persistence that comprises a set of instructions, which are suitable to be executed by the processor device by using the means for data operating storage and processing, wherein said system comprises: a browser extension comprising program elements Content Script and Background Script, which are suitable for: forming a hierarchy, grouping fields and a report file for HTML-documents of a webpage, as well as a program recognition module that may be used for identification of elements of the HTML-documents on the webpage; the system is configured to generate a separate Content Script for each HTML-document; each Content Script may be used for: forming an identifier for each HTML-document of the webpage, searching for an in-line frame inside each separately generated Content Script, generating an identifier for each found in-line frame, determining invisible elements in each HTML-document, determining visible elements in each HTML-document, as well as determining elements with child documents, grouping the found visible elements in each HTML-document and creating a report file, transmitting the report file from the Content Script to the Background Script, wherein the Background Script may be used for: forming elements of the obtained structure of each HTML-document of the webpage into a single tree and sending information about the grouped pages to a program recognition module, the program recognition module may be used for: determining all clickable elements and/or large texts on the webpage and/or form submission buttons and/or labels for each input field and/or presence of elements on the webpage, which are labels for input fields, and/or determining whether elements of the input fields and buttons are elements of a single group and/or determining classes for each input field, and sending the obtained results to the Background Script, wherein the Background Script may be used for: sending the results obtained from the program recognition module to each Content Script of the html-document of the webpage.

In one of the embodiments, the system generates the Content Script for a root HTML-document and for each separate HTML-document, forbidding the access to other HTML-documents.

According to further embodiment of the system, each in-line frame is used for assigning a unique identifier thereto.

According to further embodiment of the system, each Content Script, except for the Content Script for the root document, may be used to send a message from a parent Content Script with an identifier of a parent in-line frame.

According to further embodiment of the system, a pair "identifier of the document—identifier of the parent in-line frame" is used to determine a hierarchy between the HTML-documents.

According to further embodiment, the system may be used for excluding invisible elements of the HTML-documents from further analysis.

According to further embodiment, the system may be used for processing elements, which comprise input fields with tags INPUT, SELECT, TEXTAREA in each HTML-document.

According to further embodiment of the system, the report file is used to display the hierarchy and associations between visible elements of the webpage.

According to further embodiment of the system, the obtained tree of elements may be used for calculating coordinates of each element of the webpage.

According to a third implementation aspect, the invention has at least one machine-readable data carrier that comprises a set of machine instructions, which are suitable to be executed by a processor device: in order to perform, by the program elements Content Script and Background Script, forming a hierarchy, grouping fields and a report file for HTML-documents of a web-page, as well as for identifying elements of HTML-documents of the webpage by means of a program recognition module: by running a separate Content Script for each HTML-document followed by generation of an identifier for each HTML-document of the webpage inside the Content Script, by searching for an in-line frame inside each separately generated Content Script, by generating an identifier for each found in-line frame with determining invisible elements in each HTML-document and determining visible elements in each HTML-document, as well as elements with child documents, by grouping the found visible elements in each HTML-document and by creating a report file with sending the created report file from the Content Script to the Background Script, and by forming the obtained structure of elements of each HTML-document of the page into a single tree of elements, and by sending information about the grouped pages with the Background Script to the program recognition module to determine all clickable elements and/or large texts on the page and/or form submission buttons and/or labels for each input field and/or presence of an element on the page that is a label for the input field and/or determining whether the elements of the input fields and buttons are elements of a single group and/or determining classes for each input field followed by sending the obtained results from the program recognition module to the Background Script, from the Background Script the results are sent to each Content Script of the html-document of the webpage.

In one of embodiments of the machine-readable data carrier, the latter comprises a set of machine instructions, which are configured for each Content Script separated by its HTML-document, wherein the access to other HTML-documents is forbidden.

According to further embodiment of the machine-readable data carrier, the latter comprises a set of machine instructions, which are configured to send, into each in-line frame, a message with a unique identifier assigned thereto.

According to further embodiment of the machine-readable data carrier, the latter comprises a set of machine instructions, which are configured to send a message with an identifier of a parent in-line frame into each Content Script, except for the root one, parent Content Script.

According to further embodiment of the machine-readable data carrier, the latter comprises a set of machine instructions, which are configured to determine a hierarchy between the documents by a pair "identifier of the document—identifier of the parent in-line frame".

According to further embodiment of the machine-readable data carrier, the latter comprises a set of machine instructions, which are configured to exclude invisible elements of HTML-documents from further analysis.

According to further embodiment of the machine-readable data carrier, the latter comprises a set of machine instructions, which are configured to determine elements to be processed in each HTML-document and comprise input fields with tags INPUT, SELECT, TEXTAREA.

According to further embodiment of the machine-readable data carrier, the latter comprises a set of machine instructions, which are configured for a report file, wherein the hierarchy and associations between visible elements of the webpage are displayed.

According to further embodiment of the machine-readable data carrier, the latter comprises a set of machine instructions, which are configured to receive the tree of elements, wherein coordinates of each element of the webpage are calculated.

It should be appreciated that the presented general description and further detailed description is solely illustrative and explanatory, and does not limit the claimed invention.

DETAILED DESCRIPTION

Figure 1:
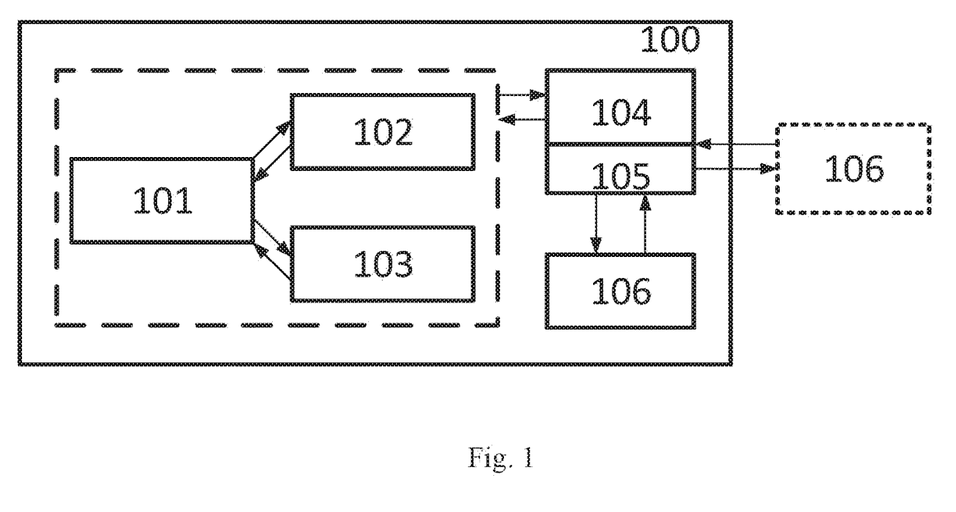
FIG. 1—An overall diagram of the system
FIG. 2—An interaction diagram of components of the system for classifying input fields
FIG. 3—An overall structure of a webpage
FIG. 4—An overall structure of a webpage, when using the Content Script
FIG. 5—An overall flow diagram of the method
FIG. 6—A flow diagram of the algorithm for classifying fields

FIG. 1 depicts an overall diagram of the system 100 for classifying fields and group of fields that comprises, connected with each other by a communication interface, a processor device 101 and a means 102 for data operating storage and processing, and a means 103 for data persistence. A personal computer, a portable computer (laptop) and similar devices, e.g., devices available from AppleInc©, such as iMac, MacBook etc. may act as the processor device 101. The processor may be a series Ax processor available from AppleInc© or the one of series IvyBridge, Haswell, Skylake available from IntelCore© and similar. A machine-readable data carrier comprising an external memory of a computer system, e.g., a solid-state drive (SSD) for storing data, acts as the means 103 for data persistence. The means 102 for data operating storage and processing comprises an external memory that includes read-only memory (ROM) and random access memory (RAM) for storing a set of instructions, which are configured to be executed by the processor. The machine-readable data carrier is equipped with an operation system, e.g., Mac OS available from AppleInc C. Also, said system comprises: a web-browser 104, e.g., Google Chrome, with an extension 105 installed therefor that comprises program elements Content Script and Background Script, as well as a program recognition module 106.

Figure 2:
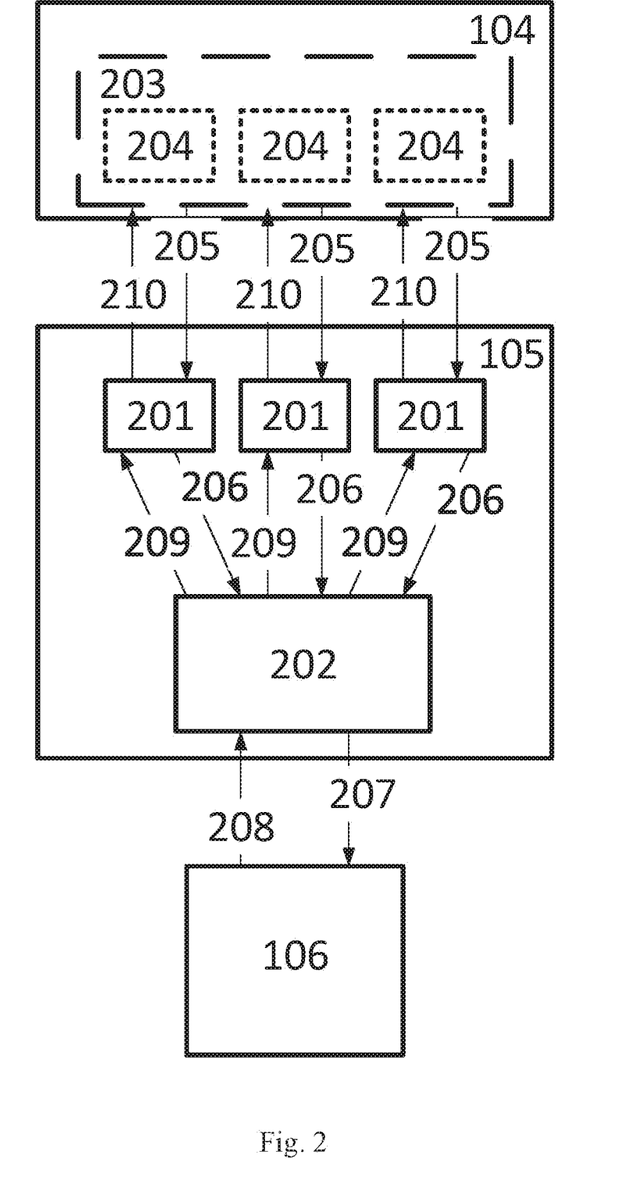

FIG. 2 shows an interaction diagram of components of the system for classifying input fields. The web-browser 104 has the extension 105 comprising the program element Content Script 201 and the program element Background Script 202, which are applicable for: forming a hierarchy, grouping fields of a webpage 203 that are comprised in a HTML-document 204, as well as forming a report file 206 that is used for transmitting data to the Background Script 202. In the same way, the Background Script 202 is used for transmitting information 207 about the grouped elements of the webpage 203 to the program recognition module 106. In turn, the program recognition module 106 may be used: for processing results of classification of fields of all HTML-documents 204 and transmitting data 208 about them to the Background Script 202. Therewith, the Background Script 202 may be used for: sending results 209 of classification of fields of the specific HTML-document 204, which are received from the program recognition module 106, to each Content Script 201 of the HTML-document 204 of the webpage 203, which may be used for automatic fill 210 of forms and fields of the webpage 203.

FIG. 3 shows a hierarchy and mutual arrangement of documents on the webpage 203. Since the webpage 203 may contain several HTML-documents 204, a hierarchy and a relationship must be established between all HTML-documents 204 of the webpage 203. The webpage 203 may be represented by several "catalogs" IFRAME 301, which have other HTML-documents 204 with their elements inside. All of them must be associated between each other. Therewith, FIG. 4 shows that for each HTML-document 204 the separate Content Script 201 is run that is not associated with other HTML-documents 204, which, in turn, may be associated between each other by the integral webpage 203 that is viewed by the User.

Figure 5:
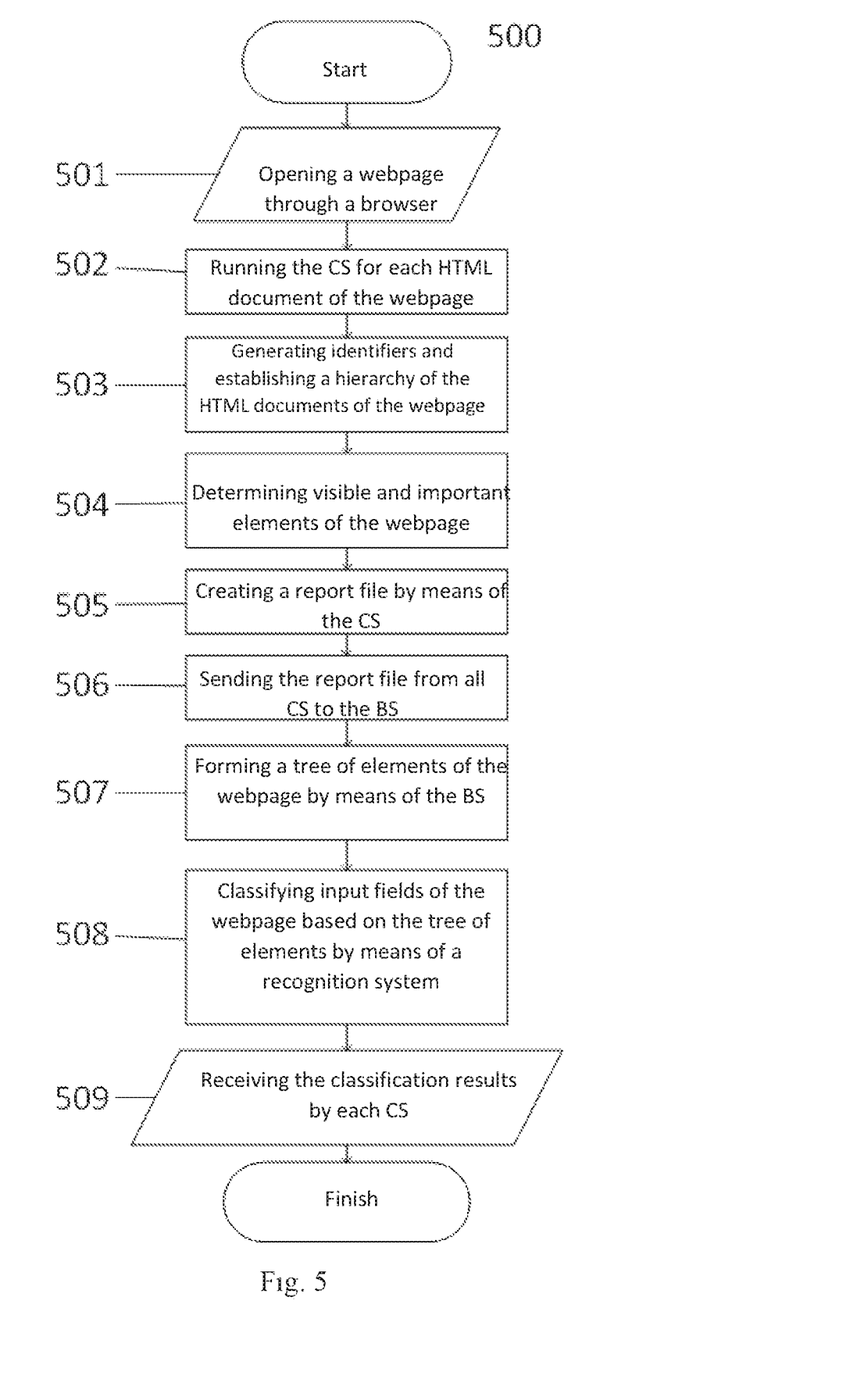

FIG. 5 shows an overall flow diagram of implementation of a method 500. At the step 501, the webpage 203 is opened through the browser 104, at the step 502, the separate Content Script is run for each HTML-document 204 of the webpage 203. IFRAME 301 are located inside each Content Script 201, at the step 503, unique identifiers are generated for each Content Script 201 and IFRAME 301. At the step 504, important visible elements are determined in each HTML-document 204. The html-code of the webpage 203 comprises a plurality of elements, which are necessary for a specific display of the page (e.g., labeling, java-scripts etc.), however, these elements remain invisible for the user. Since these elements are not displayed on the webpage 203 (they are invisible for the user when viewing the page), they cannot be input fields. Invisible elements are identified in the html-code and excluded from further analysis. Therefore, all identified important visible elements are forwarded to further analysis.

Not all visible elements of the page are necessary for classifying the input fields. For example, tags SCRIPT, IMG, comments are not required. It is necessary to determine input fields (with tags INPUT, SELECT, TEXTAREA), elements comprising text, elements with child documents (IFRAME) on the page. Therefore, non-important elements are excluded and the important ones are identified for further identifying the input fields.

Important visible elements are grouped in each HTML-document 204. Information about each important and visible element of the document is stored inside the Content Script 201 of each HTML-document 204. The information includes tag, location of the element in the document, attributes of the element, styles comprising a text, information about a parent element, about child elements. At the step 505, results of all previous steps are grouped and fixed, on the basis of which a report file is created (usually, JSON).

At the step 506, the created report file is sent from the Content Script 201 to the Background Script 202.

At the step 507, the grouped elements of all HTML-documents 204 of the webpage 203 are assembled into a single entity in the Background Script 202. Having obtained a structure of elements of each HTML-document 204 of the webpage 203, identifiers of each document and identifiers of the parent IFRAME 204 for each document (except for the root one) are assembled into a single tree of elements. Coordinates of each element of the webpage (actual location of elements on the page along X axis and Y axis) are calculated in such tree. At the step 508, the obtained results are sent to the program recognition module to determine classes of the input fields and their grouping. At the step 509, the results are sent from the program recognition module to each Content Script 201.

The program recognition module 106 comprises 5 machine learning models (hereinafter referred to as the Model) that analyze different data in a stepwise and successive fashion and provide a response as to the class that the input fields on the webpage belong to (e-mail/name/login/password/phone number etc.). A dataset, wherein elements being necessary for classification of the input fields are located, is created for each Model.

Figure 6:
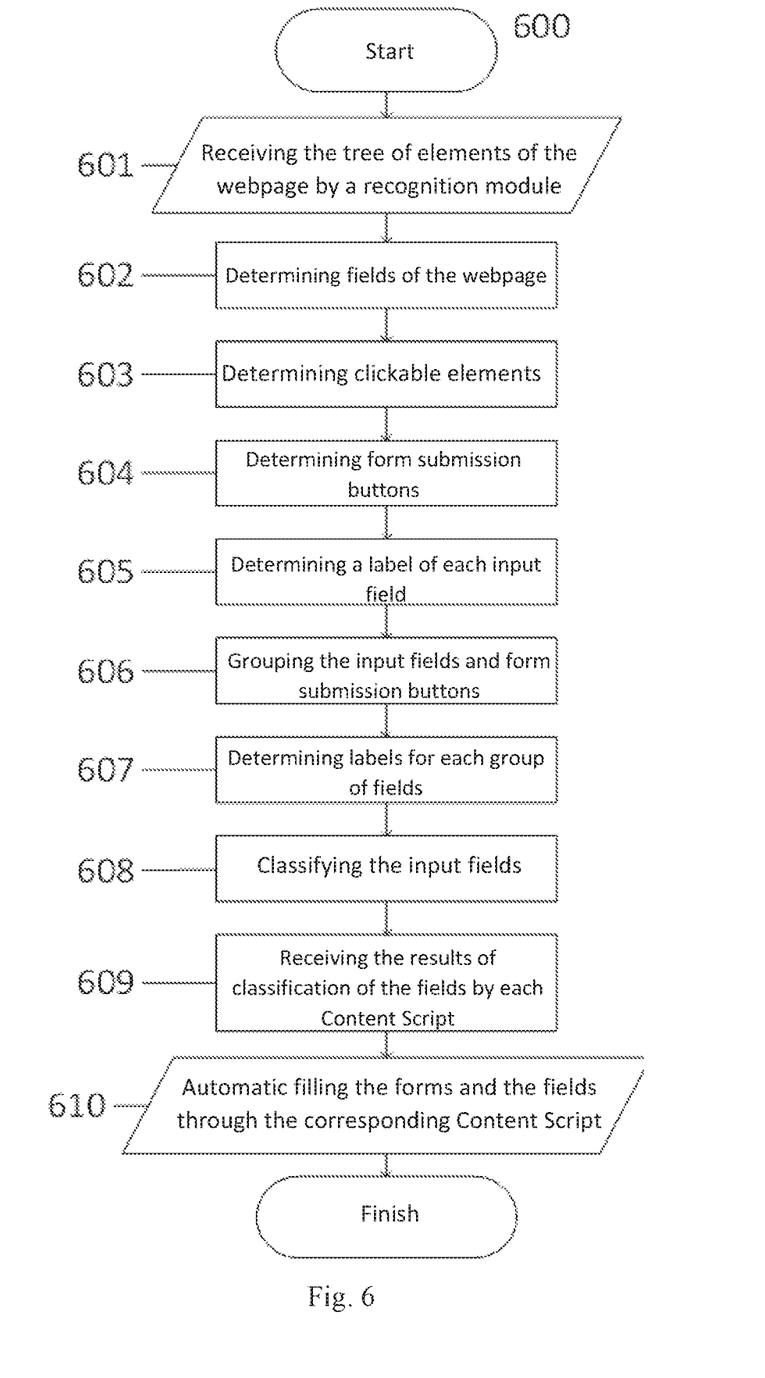

FIG. 6 shows a flow diagram of an algorithm 600 for classifying fields that is implemented by means of the program recognition module 106. At the steps 601, the program recognition module 106 receives data about the hierarchy of the webpages 203, on the basis of which:

at the step 602, all fields are determined on the webpage 203, at the step 603, all clickable elements are determined on the webpage 203. Clickable elements are elements, pressing on which may cause execution of a JavaScript-code. That is, these elements are with tags BUTTON, A and handlers of events onmouseup, onmousedown;

at the step 604, form submission buttons are determined. There may be several clickable elements on the page, however, not all of them are form submission buttons. Thus, those elements, which are form submission buttons, are determined among all clickable elements by means of the Model 1. That is, information about all clickable elements is entered at the input of the Model 1. The Model 1 provides the following response at the output: as to whether the clickable element is a form submission button. Therefore, at the present step, form submission buttons on the page are determined;

at the step 605, a label is determined for each input field. Usually, there is a label adjacent to each field on the pages, the label indicates, which information should be entered into the field. It is necessary to associate the adjacent element that comprising such label. To this end, we use all pairs of the type "field—element" on the page, thereby sorting all elements and all fields. For each pair we calculate the Euclidean distance between the element and the field, "x" axis shift relative to left edges, "x" axis shift relative to right edges, "x" axis shift relative to centers, "y" axis shift relative to lower edges, "y" axis shift relative to upper edges, "y" axis shift relative to centers. The obtained data are sent to the Model 2, wherein we obtain information as to "whether the element is a label for the field" for each pair. In case if two and more elements were determined by the Model 2 as labels for the field, we will use the Model 3 in order to select the most probable label for the field. The Model 3 will run only in case if several labels were found for the field, while in case if only one element was determined as a label for the field, the Model 3 will not run;

at the step 606, input fields and form submission buttons are grouped. After the form submission buttons, as well as labels for the fields, are determined, all data from the above steps is arranged into the Model 4. A decomposition of the tree into sub-trees is obtained. Each of the sub-trees is a separate group of elements;

at the step 607, labels for each group of fields is determined. It is necessary to choose 10 (conditionally, there may be 5) largest labels based on font sizes and stroke weight of the text. It is necessary to associate each of the labels with the closest group of elements. To this end, a distance from the labels to the input fields and a fact of arrangement of the label above the input fields or below them are taken. Stroke weight and size of the font are also considered. Therefore, the label that is closest to the field with the most bold and large font arranged above the input fields will likely be a label of the group of fields;

at the step 608, the input fields are classified. Text of attributes (by means of scanning the HTML-code), text of the tag (by means of scanning the HTML-code), text of the associated label, texts of the associated labels with the group of this field, are chosen for each input field. The obtained texts are sent to the Model 5.

Results of the classification of the fields and grouping of the fields are sent from the program recognition module 106 to the Background Script 202. Results of classification of the fields, grouping of the fields are sent from the Background Script 202 to each Content Script 201 of the webpage 203 (step 609).

As a result, information as to which class the input fields on the webpage 203 belong to is sent to the system for automatic fill of forms and fields (i.e. that the input field name belongs directly to the name, password—to the password, e-mail—to the e-mail, phone number—to the phone number, credit card number—to the credit card number etc.). The obtained information may be used for automatic fill of forms and fields through the corresponding Content Script 201 (step 610).

Therewith, all Models are utilized in the process of identification and each further solution is made based on conclusions of a preceding Model.

Description of the Models of the program recognition module is presented below.

The Model 1 determines clickable elements (buttons).

Obtaining a feature vector from the grouped page:

The following properties are selected for each clickable element of the page: 'tagName', 'id', 'type', 'class', 'value', 'text', 'name'. A JSON-document for the ConditionalRandomField (CRF) of the model is formed from the obtained data. The Model determines whether a certain clickable element is a form submission button.

Model 2 (Label Classification)

Obtaining a feature vector from the grouped page:

All pairs of the type "field—element" on the page are taken, all elements and all fields are sorted. For each pair the Euclidean distance between the element and the field, "x" axis shift relative to left edges, "x" axis shift relative to right edges, "x" axis shift relative to centers, "y" axis shift relative to lower edges, "y" axis shift relative to upper edges, "y" axis shift relative to centers, are calculated. The feature vector is obtained for each pair of the type "field—element" from the above-described numbers.

It is necessary to obtain the feature vector with a labeling result for each pair of the type "field—element" for each grouped labeled page from the dataset. The obtained model determines whether a certain element on the page is a label for a certain input field. The model determines in a binary fashion (yes/no).

Model 3 (Label Regression)

The operating principle of the model is the same as in the model 2. The obtained model determines a probability of the fact that a certain element on the page is a label for a certain input field.

Model 4 (Tree Grouping)

Obtaining a feature vector from the grouped page:

All input fields and all form submission buttons on the page are taken, a complete graph is assembled. Nodes of the graph will be fields and buttons. Edges will be Euclidean distance between elements in the nodes. A minimal main graph tree is calculated. The following properties are calculated for each edge: whether the input field is one of the nodes, whether the button is one of the nodes, the Euclidean distance between the nodes, "x" axis shift relative to left edges, "x" axis shift relative to right edges, "x" axis shift relative to centers, "y" axis shift relative to lower edges, "y" axis shift relative to upper edges, "y" axis shift relative to centers.

The feature vector with the labeling result (as to whether the nodes are located in a single group) is obtained for each tree edge for each grouped labeled page from the dataset. The obtained model determines whether or not the elements (input fields of the button) belong to a single group.

Model 5 (Classification of the Fields)

A feature vector from the grouped page is obtained:

The following properties are selected for each input field: 'label', 'aria-label', 'placeholder', 'text', 'type', 'name', 'id', 'autocomplete', 'aria-label', 'placeholder', 'name', 'id'. Furthermore, the text of the found label for the input field is added to the vector. Furthermore, texts of large texts, which are associated to the group that comprises the field, are added to the vector. Furthermore, texts of the buttons, which are associated to the group that comprises the field, are added to the vector. A JSON-document for the Conditional Random Field (CRF) of the model is formed from the obtained data. The obtained model determines classes for each input field.

The invention claimed is:

1. A computer-implemented method comprising:
identifying content of a webpage, the webpage comprising input fields and groups of input fields, the webpage comprising one or more HTML-encoded documents, the identifying comprising:
generating, for each HTML-encoded document of the one or more HTML-encoded documents, a document identifier of the HTML-encoded document;
for each HTML-encoded document having one or more in-line frames, generating, for each in-line frame of the one or more in-line frames, a frame identifier and a parent identifier, wherein the parent identifier identifies the HTML-encoded document having the respective in-line frame;
determining, for each HTML-encoded document, whether one or more invisible elements exist;
determining, for each HTML-encoded document, whether one or more visible elements exist;
grouping the visible elements to create a report file, the report file comprising a hierarchical structure associated with the one or more visible elements or the one or more invisible elements or a combination of the one or more visible elements and the one or more invisible elements, wherein the hierarchical structure comprises, for each in-line frame, an in-line frame hierarchical structure; and outputting the report file;
determining, based on the report file, a single tree data structure comprising a single tree of elements for each HTML-encoded document of the webpage; and
outputting the single tree data structure.

2. The computer-implemented method of claim 1, further comprising:
determining, on the webpage, one or more clickable elements,
wherein the determining the single tree data structure is further based on the determination of the one or more clickable elements.

3. The computer-implemented method of claim 2, wherein the determining clickable elements comprises:
determining whether the clickable elements comprise one or more of:
large texts on the webpage;
form submission buttons;
a label for each input field;
whether buttons, for each input field, are elements of a single group or classes; or
whether elements of the input field are elements of a single group or classes.

4. The computer-implemented method of claim 1, wherein the determining visible elements in each HTML-encoded document comprises:
determining visible elements within any child HTML-encoded document.

5. The computer-implemented method of claim 1,
wherein each execution of the identifying content of the webpage is separated by each execution's HTML-encoded document, and
wherein access across each execution of the identifying content of the webpage is forbidden.

6. The computer-implemented method of claim 1, further comprising:
sending, into each in-line frame, a message with a unique identifier of the in-line frame.

7. The computer-implemented method of claim 1, further comprising:
generating document identifiers for each HTML-encoded document within each in-line frame, a second document identifier; and
generating, for each in-line frame and based on the parent identifier of the in-line frame and based on the second document identifier, a second single tree data structure for the in-line frame,
wherein the grouping to create the report file further comprises grouping, based on the parent identifier and a corresponding document identifier, the second single tree data structure as the in-line frame hierarchical structure.

8. The computer-implemented method of claim 7, further comprises:
sending, to each execution of the generating the second single tree data structure, the parent identifier.

9. The computer-implemented method of claim 1, further comprising:
identifying a hierarchical relationship between the HTML-encoded documents by a pair of identifiers comprising a first identifier of the HTML-encoded document and a second identifier of the parent's in-line frame.

10. The computer-implemented method of claim 1, wherein the invisible elements of the HTML-encoded documents are excluded from further analysis.

11. The computer-implemented method of claim 1, further comprising:
storing the hierarchical relationship and association between visible elements of the webpage in the report file.

12. The computer-implemented method of claim 1, wherein the single tree of elements comprises coordinates of each element of the webpage.

13. An apparatus comprising:
one or more processors; and
memory storing instructions that, when executed by the one or more processors, cause the apparatus to:
identify content of a webpage, the webpage comprising input fields and groups of input fields, the webpage comprising one or more HTML-encoded documents, the instructions to identify comprising instructions to:
generate, for each HTML-encoded document of the one or more HTML-encoded documents, a document identifier of the HTML-encoded document;
for each HTML-encoded document having one or more in-line frames, generate, for each in-line frame of the one or more in-line frames, a frame identifier and a parent identifier, wherein the parent identifier identifies the HTML-encoded document having the respective in-line frame;
determine, for each HTML-encoded document, whether one or more invisible elements exist;
determine, for each HTML-encoded document, whether one or more visible elements exist;
group the visible elements to create a report file, the report file comprising a hierarchical structure associated with the one or more visible elements or the one or more invisible elements or a combination of the one or more visible elements and the one or more invisible elements, wherein the hierarchical structure comprises, for each in-line frame, an in-line frame hierarchical structure; and
output the report file;
determine, based on the report file, a single tree data structure comprising a single tree of elements for each HTML-encoded document of the webpage; and
output the single tree data structure.

14. The apparatus of claim 13, the instructions further causing the one or more processors to:
determine, on the webpage, one or more clickable elements,
wherein the determination of the single tree data structure is further based on the determination of the one or more clickable elements.

15. The apparatus of claim 14, wherein the instructions to determine the clickable elements further cause the one or more processors to:
determine whether the clickable elements comprise one or more of:
large texts on the webpage;
form submission buttons;
a label for each input field;
whether buttons, for each input field, are elements of a single group or classes; or
whether elements of the input field are elements of a single group or classes.

16. The apparatus of claim 13, wherein the instructions to determine the visible elements in each HTML-encoded document further cause the one or more processors to:
determine visible elements within any child HTML-encoded document.

17. The apparatus of claim 13,
wherein each execution of the identifying content of the webpage is separated by each execution's HTML-encoded document, and
wherein access across each execution of the identifying content of the webpage is forbidden.

18. The apparatus of claim 13, wherein the instructions further cause the one or more processors to:
send, into each in-line frame, a message with a unique identifier of the in-line frame.

19. The apparatus of claim 13, wherein the instructions further cause the one or more processors to:
generate document identifiers for each HTML-encoded document within each in-line frame, a second document identifier; and
generating, for each in-line frame and based on the parent identifier of the in-line frame and based on the second document identifier, a second single tree data structure for the in-line frame,
wherein the instructions to group to create the report file further comprises instructions to group, based on the parent identifier and a corresponding document identifier, the second single tree data structure as the in-line frame hierarchical structure.

20. The apparatus of claim 19, wherein the instructions further cause the one or more processors to:
send, to each execution of the generation of the second single tree data structure, the parent identifier.

\* \* \* \* \*